US008493445B2

(12) United States Patent
Degnan, III et al.

(10) Patent No.: US 8,493,445 B2
(45) Date of Patent: Jul. 23, 2013

(54) SCANNER/OPTICAL SYSTEM FOR THREE-DIMENSIONAL LIDAR IMAGING AND POLARIMETRY

(75) Inventors: John James Degnan, III, Annapolis, MD (US); David Nelson Wells, Silver Spring, MD (US)

(73) Assignee: Sigma Space Corp, Lanham, MD (US)

( * ) Notice: Subject to any disclaimer, the term of this patent is extended or adjusted under 35 U.S.C. 154(b) by 1897 days.

(21) Appl. No.: 11/683,549

(22) Filed: Mar. 8, 2007

(65) Prior Publication Data
US 2007/0279615 A1 Dec. 6, 2007

Related U.S. Application Data

(60) Provisional application No. 60/809,626, filed on May 31, 2006.

(51) Int. Cl.
*H04N 7/18* (2006.01)
(52) U.S. Cl.
USPC ......... 348/144; 348/5.01; 348/4.01; 348/117; 348/67; 348/146
(58) Field of Classification Search
USPC .................. 348/144; 356/5.01, 4.01, 117, 67, 356/146
See application file for complete search history.

(56) References Cited

U.S. PATENT DOCUMENTS

| | | | |
|---|---|---|---|
| 5,237,331 A | 8/1993 | Henderson et al. | |
| 5,317,376 A * | 5/1994 | Amzajerdian et al. | 356/28.5 |
| 5,483,342 A * | 1/1996 | Rockwell | 356/491 |
| 5,831,724 A * | 11/1998 | Cordes | 356/141.1 |
| 6,147,747 A * | 11/2000 | Kavaya et al. | 356/4.01 |
| 6,343,245 B1 | 1/2002 | Degnan | |
| 6,556,282 B2 * | 4/2003 | Jamieson et al. | 356/4.01 |
| 6,584,133 B1 * | 6/2003 | Walker et al. | 372/92 |
| 6,661,577 B1 * | 12/2003 | Wu et al. | 359/619 |
| 6,664,529 B2 | 12/2003 | Pack et al. | |
| 7,151,882 B2 * | 12/2006 | Suzuki et al. | 385/147 |
| 7,227,116 B2 * | 6/2007 | Gleckler | 250/208.1 |
| 7,248,342 B1 * | 7/2007 | Degnan | 356/5.01 |

(Continued)

OTHER PUBLICATIONS

Heimel et al., "Mechanisms for atmospheric research by spaceborne LIDAR techniques", Sixth European Space Mechanisms and Tribology Symposium, Proceedings of the conference, Oct. 4-6, 1995, p. 425.*

(Continued)

*Primary Examiner* — Lan-Dai T Truong
(74) *Attorney, Agent, or Firm* — Miodrag Cekic; Intellectual Property Strategists, LLC (57) ABSTRACT

An optical scanner system for contiguous three-dimensional topographic or volumetric imaging of a surface from an aircraft or spacecraft is disclosed. A servo controller synchronizes the rotation rates of a pair of wedge scanners with high precision to the multi-kilohertz laser fire rate producing an infinite variety of well-controlled scan patterns. This causes the beam pattern to be laid down in precisely the same way on each scan cycle, eliminating the need to record the orientations of the wedges accurately on every laser fire, thereby reducing ancillary data storage or transmission requirements by two to three orders of magnitude and greatly simplifying data preprocessing and analysis. The described system also uses a holographic element to split the laser beam into an array that is then scanned in an arbitrary pattern. This provides more uniform signal strength to the various imaging detector channels and reduces the level of optical crosstalk between channels, resulting in a higher fidelity three-dimensional image.

36 Claims, 6 Drawing Sheets

U.S. PATENT DOCUMENTS

| | | | |
|---|---|---|---|
| 2003/0043363 A1* | 3/2003 | Jamieson et al. | 356/5.01 |
| 2004/0031906 A1* | 2/2004 | Glecker | 250/208.1 |
| 2006/0008238 A1* | 1/2006 | Suzuki et al. | 385/147 |
| 2007/0024840 A1* | 2/2007 | Fetzer et al. | 356/4.01 |

OTHER PUBLICATIONS

Amirault et al., "Precision pointing using a dual-wedge scanner", Applied Optics, vol. 24, No. 9, May 1985, p. 1302.*

Foy et al., "Feasibility of adaptive telescope with laser probe", Astronomy and Astrophysics, Jul. 1985, pp. 1-3.*

Fredriksson, Kent A., "DIAL technique for pollution monitoring: improvements and complementary systems", Applied Optics, vol. 24, No. 19, Oct. 1985, p. 3297.*

Gleckler et al., "Three-dimensional imaging polarimetry", Laser Radar Technology and Applications VI, 2001, p. 175.*

Kalshoven et al., "Remote Sensing of the Earth's Surface with an Airborne Polarized Laser", IEEE Transactiosn on Geoscience and Remote Sensing, vol. 31, No. 2, Mar. 1993, p. 438.*

Degnan, J.J., "A conceptual design for a spaceborne 3D imaging lidar", e & i Elektrotechnik und Informationstechnikm, vol. 119, No. 4, pp. 99-106, 2002.*

U.S. Appl. No. 10/886,079, filed Jan. 12, 2006, Dimsdale et al.

U.S. Appl. No. 10/886,073, filed Jan. 12, 2006, Dimsdale.

U.S. Appl. No. 10/884,679, filed Dec. 16, 2004, Kacyra et al.

U.S. Appl. No. 10/347,908, filed Jul. 22, 2004, Jamieson et al.

* cited by examiner

SCANNER/OPTICAL SYSTEM FOR THREE-DIMENSIONAL LIDAR IMAGING AND POLARIMETRY

CROSS REFERENCE TO RELATED APPLICATIONS

This application is based upon and claims benefits of co-owned U.S. Provisional Patent Application Ser. No. 60/809,626 entitled "SCANNER/OPTICAL SYSTEM FOR THREE-DIMENSIONAL LIDAR IMAGING AND POLARIMETRY," filed with the U.S. Patent and Trademark Office on May 31, 2006 by the inventors herein. Co-owned U.S. Provisional Patent Application Ser. No. 60/809,626 is incorporated herein bay reference.

STATEMENT REGARDING FEDERALLY SPONSORED RESEARCH AND DEVELOPMENT

This invention was made and reduced to practice using US government funding under the U.S. Airforce Contract No. FA8650-05-C-1817 entitled "A 3D IMAGING AND POLARIMETIC LIDAR APPLICABLE TO MINI/MICRO UAV'S PROGRAM". The US government has certain rights in this invention.

FIELD OF THE INVENTION

The invention relates generally to scanning LIDAR systems and in particular to a system for contiguous three-dimensional imaging and polarimetry of a topographic surface or volumetric scatterer (e.g. tree canopies) and the like from an aircraft or spacecraft.

BACKGROUND OF THE INVENTION

Spaceborne laser altimeters typically use modest energy (50 to 100 milliJoules) solid-state laser, large telescopes having apertures of 50 to 100 centimeters in diameter, and high detection thresholds to achieve unambiguous surface returns with few or no false alarms resulting from solar background noise. As a result of this conventional design philosophy, spacecraft prime power and weight constraints typically restrict operations to modest repetition rates on the order of a few tens of Hz which, for a typical earth orbit ground velocity of seven kilometers per second, limits along-track spatial sampling to one sample every few hundred meters. There is great motivation in obtaining higher along-track resolution and/or better cross-track coverage, but achieving this capability through a simple scaling of the laser fire rate or power is not practical from spacecraft. This is especially true of altimeters for use in orbit about other planets where instrument mass and prime power usage is severely restricted. In summary, the conventional high signal-to-noise ratio approach to laser altimetry does not make efficient use of the available laser photons.

First generation altimetric approaches are not well suited to generating the few meter level horizontal resolution and decimeter precision vertical (range) resolution on the global scale desired by many in the Earth and planetary science communities. The first generation spaceborne altimeters are characterized by a laser operating in the infrared (1064 nm) at a few tens of Hz with moderate output energies (50 to 100 mJ), a telescope in the 50 to 100 cm range, and a single element (i.e. non-pixellated) detector that detects and processes multi-photon returns from the surface. On bare terrain, the signal waveforms reflect the slope and surface roughness within the laser footprint (typically several tens of meters in diameter) as well as any false slopes due to pointing error. On Earth, the presence of manmade buildings and volumetric scatterers (such as tree canopies or other vegetation) generally makes waveform interpretation more complex and difficult.

One major challenge to the conventional approach is the sheer number of measurements required over a nominal mission lifetime of two to three years. For example, in order to generate a 5 m×5 m vertical grid map of Mars, which has a mean volumetric radius of 3390 km, over 7 trillion individual range measurements are required, assuming that no ground spatial element is measured twice. In any realistic mission, the actual number of range measurements will be significantly larger since an instrument designed to provide contiguous coverage at the planetary equator would oversample the higher latitudes where the ground tracks are more narrowly spaced. If one were to simply scale conventional approaches, one would clearly face severe prime power, weight, and instrument longevity issues.

A second technical challenge is the high ground speed of the spacecraft (about 3 km/sec for a nominal 300 km altitude Mars orbit) coupled with the need to incorporate a scanner to cover the large area between adjacent ground tracks, especially near the equator. At a nominal altitude of 300 km, for example, the satellite would have an orbital period about Mars of approximately 113 minutes. Thus, a three-year mission would produce 13,910 orbits or 27,820 equator crossings with an average spacing between ground tracks at the equator of 766 meters. The latter spacing corresponds to about 154 resolution elements (~=5 m) in the cross-track direction between adjacent ground tracks and further implies a minimum cross-track scan angle of about 0.15 degrees. For truly contiguous coverage using a conventional single element detector, these 154 cross-track measurements must be completed in the time it takes the spacecraft to move one resolution element in the along-track direction, or within 1.67 msec. This implies a laser fire rate of 92.4 kHz. Furthermore, a uniformly rotating mechanical scanner, for example, must complete a half cycle of its movement within the same 1.67 msec period, i.e. 300 Hz (18,000 RPM). While alternative non-mechanical scanners, such as electrooptic or acousto-optic devices, are capable of very high scanning speeds and have no moving parts, they fall far short of the angular range requirements, are highly limited in their useful aperture, and require fast high voltage or high RF power drivers.

An additional technical challenge stems from the high laser fire rate and the long pulse time of flight (TOF). At 300 km altitude, the laser pulse completes a roundtrip transit to the surface in 2 msec. Thus, for laser fire rates in excess of 500 Hz, multiple pulses will be in flight simultaneously. In principle, it is easy to associate the correct return pulse with the appropriate outgoing pulse provided the roundtrip satellite-to-surface TOF is known beforehand to well within a single laser fire interval. For the 92.4 kHz rate derived previously, however, approximately 185 pulses would be simultaneously in transit, and it would be necessary to have knowledge of the orbit at the 1.6 km level in order to tie a given surface return to the appropriate output pulse unambiguously. While such a navigation accuracy might be easy to achieve in Earth orbit using either Global Positioning System (GPS) receivers or Satellite Laser Ranging (SLR) to passive reflectors on the spacecraft, it would likely be a much more difficult challenge in orbits about extraterrestrial bodies.

An additional technical problem associated with the longer pulse TOF from orbit is related to "transmitter point-ahead", i.e. the offset between the center of the laser beam at the surface and where the receiver is looking one 2 msec round trip transit time later. For an unscanned system, the offset due to a 3 km/sec spacecraft ground velocity is only 6 m (slightly more than one resolution element) in the along-track direction and can be easily accommodated, either by a fixed offset of the transmitter in the positive along-track direction or by a modest increase in the receiver field of view (FOV). In the current example, however, the scanner must complete over half a cycle of its scan within the pulse TOF. Thus, the receiver FOV must be opened up to span the full 0.15 degree separation (766 m) between ground tracks in the cross-track dimension while the laser illuminates only a 5 m diameter circle within that FOV and defines the ground resolution element being interrogated. This approach greatly increases the solar background noise incident on the detector during local daytime operations relative to the unscanned case and elevates the laser output energy requirements for good discrimination of the signal. An alternative low noise approach would be to steer the transmitter and receiver independently, which will be discussed in later sections.

The surface return rate of an Earth orbiting altimeter can be increased by two to four orders of magnitude for a given laser output power by emitting the available photons in high frequency (few kilohertz) train of low energy (approximately one milliJoule) pulses as opposed to a low frequency train of high energy pulses and employing single photon detection. This mode of operation reduces the risk of internal optical damage to the laser, thereby improving long-term reliability, and makes the beam inherently more eyesafe to a ground-based observer. In addition, these high return rates can often be accomplished with much smaller telescope apertures. Indeed, if the number of receiver stops per timing channel is limited, the contrast of the terrain signal against the solar-induced noise background is actually enhanced through the use of a smaller receive telescope.

SUMMARY OF THE INVENTION

The present invention is directed to an imaging LIDAR system for use onboard an aircraft or spacecraft. The imaging LIDAR system includes: a light source transmitting a train of light pulses; an optical scanner comprising, a first optical wedge, a second optical wedge, and means for rotating the first and second optical wedges; a means for detecting a reflected beam of light received from the scanning means and generating signals responsive to the light; and a processor system for processing signals from the detecting means.

Apparatus embodying the present invention includes a microchip laser associated with a small diameter telescope. The microchip laser emits pulses of coherent light at a high repetition rate. The emitted laser pulses are collimated by the telescope and transmitted to the ground. Photons are reflected off the ground. The return photons are filtered through a spectral filter and through a spatial filter to reduce solar background noise. The telescope then receives the return photons and supplies them to a multi-pixel detector array or a multi-anode photomultiplier single photon detection system.

The use of relatively simple software algorithms based on post-detection Poisson filtering techniques enables the identification and extraction of surface sampling data from the more abundant optical background noise prior to on-board storage or transmission of data to the ground station.

An order of magnitude reduction in required telescope diameter greatly reduces the size, power requirements, and mechanical complexity of an external optical scanning system and allows the use of relatively inexpensive, modest diameter optical wedges or holographic optical elements to simultaneously scan both the transit and receive beams for cross-track interrogation of the terrain while maintaining narrow fields of view for background noise suppression.

Performance is further enhanced by using state of the art photon counting array detectors or segmented anode photomultipliers, which are capable of providing sub-centimeter level ranging resolution as well as angularly resolving the source of a single photon event within the receiver field-of-view. With high angular resolution of the single photon source, the measured range becomes nearly a point-to-point measurement, i.e. from an internal altimeter reference point to a small area of uncertainty on the surface. The horizontal spatial resolution is determined by the angular resolving power of an individual pixel in the photodetector and the height of the host aircraft or spacecraft relative to the ground, and the surface area subtended by the pixel can be very small (1% or less depending on the number of detector elements) compared to the total laser beam area on the ground. The ranging precision then is limited by the laser pulse width, the timing capabilities of the range receiver, and the much-reduced residual spreading caused by the roughness of the surface and slope within the relatively small area viewed by a single detector pixel. This ability to measure the near point-to-point-time-of-flight of an individual photon avoids much of the range ambiguity inherent in current high-energy altimeters, especially as they relate to volumetric scatterers such as tree stands and canopies. Such systems typically require hundreds to thousands of photons reflected from anywhere within an illuminated spot to be recorded by waveform digitizers. The latter devices consume relatively large amounts of power and generate large data volumes that must be stored onboard and/or transmitted to the ground via a wide bandwidth communications link. Furthermore, the signals must be deconvoluted using sophisticated and not completely reliable algorithms in order to decipher the results and obtain a single range measurement.

The apparatus and method embodying the present invention will provide significantly greater spatial resolution in either the along-track or cross-track directions or both, as well as greatly reduced demands on spacecraft resources such as prime power, volume, and weight allocations. Potential altimeter targets are land, ice, and water surfaces as well as distributed or semi-porous soft targets such as clouds, planetary boundary layers, tree canopies and other vegetation. The much-reduced signal levels of the microaltimeter embodying the present invention relative to conventional altimeters are largely offset by a corresponding reduction in the detection thresholds to one photoelectron or less so that instrument sensitivity is enhanced. As a result, geoscience applications including development of high resolution, high accuracy topographic databases useful for studying hydrogical runoff, the effects of clouds on radiation balance, changes in sea, lake, or reservoir levels, changes in ice sheet thickness, tree canopy heights and crops and biomass assessment are all possible through use of the apparatus and method embodying the present invention. Applications to extraterrestrial science missions—including low power, high-resolution topographic mapping of other planets, moon, asteroids, and comets within the Solar System—may also be carried out through the apparatus, and method of this invention. The apparatus and method of this invention may also be used for aerial surveying of natural and man-made objects in cities and towns, and/or the generation of local topographic maps from high aircraft cruise altitudes that do not require special Federal Aviation Administration waivers.

In the basic original first concept of the invention, a dual wedge scanner with means of rotating the wedges to produce the desired scan pattern, a line, was determined. This initial concept consisted of a mechanically linked gear system that resulted in the two wedges rotating at exactly the same rate and in opposite directions. When this type of geometry is used, it can be shown by simple optical analysis that the resulting deflection of the laser beam with respect to time is a simple linear raster scan.

Although this simple mechanically linked scanning method would have resulted in a linear deflection (as contrasted with, for example, a conical scan), certain disadvantages exist with that original mechanically geared system concept:

1. The use of gear synchronization limited the flexibility of the system. For example, a gear linked system would generally not be able to easily change the angle of the line with respect to the mechanical axis without some means to change the relative phasing of the gears, or by rotation of the entire mechanism about an axis.
2. The LIDAR systems used employed free-running passively Q-switched microchip lasers, which typically produce subnanosecond pulses at design rates between 8 and 22 kHz. These pulses were not initially conceived of as being linked in any way to the angular motion of the wedges. It was therefore necessary, in order to accurately locate the beam position on the surface, to record the precise positions of the wedges when each laser pulse fired. As a result, additional data acquisition information would have been required, and it would have been necessary to post-process the data taking into account the exact angular wedge position for each shot. Such a scheme would have considerably complicated the data acquisition, storage, and processing procedures for the system.

It is a principal aspect of the present invention to provide an apparatus and method for low power, contiguous, high-resolution imaging (3D, polarimetric, or spectral) from an aircraft or an orbiting spacecraft, or the like.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF THE INVENTION

The invention summarized above may be better understood by referring to the following description, which should be read in conjunction with the accompanying drawings. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
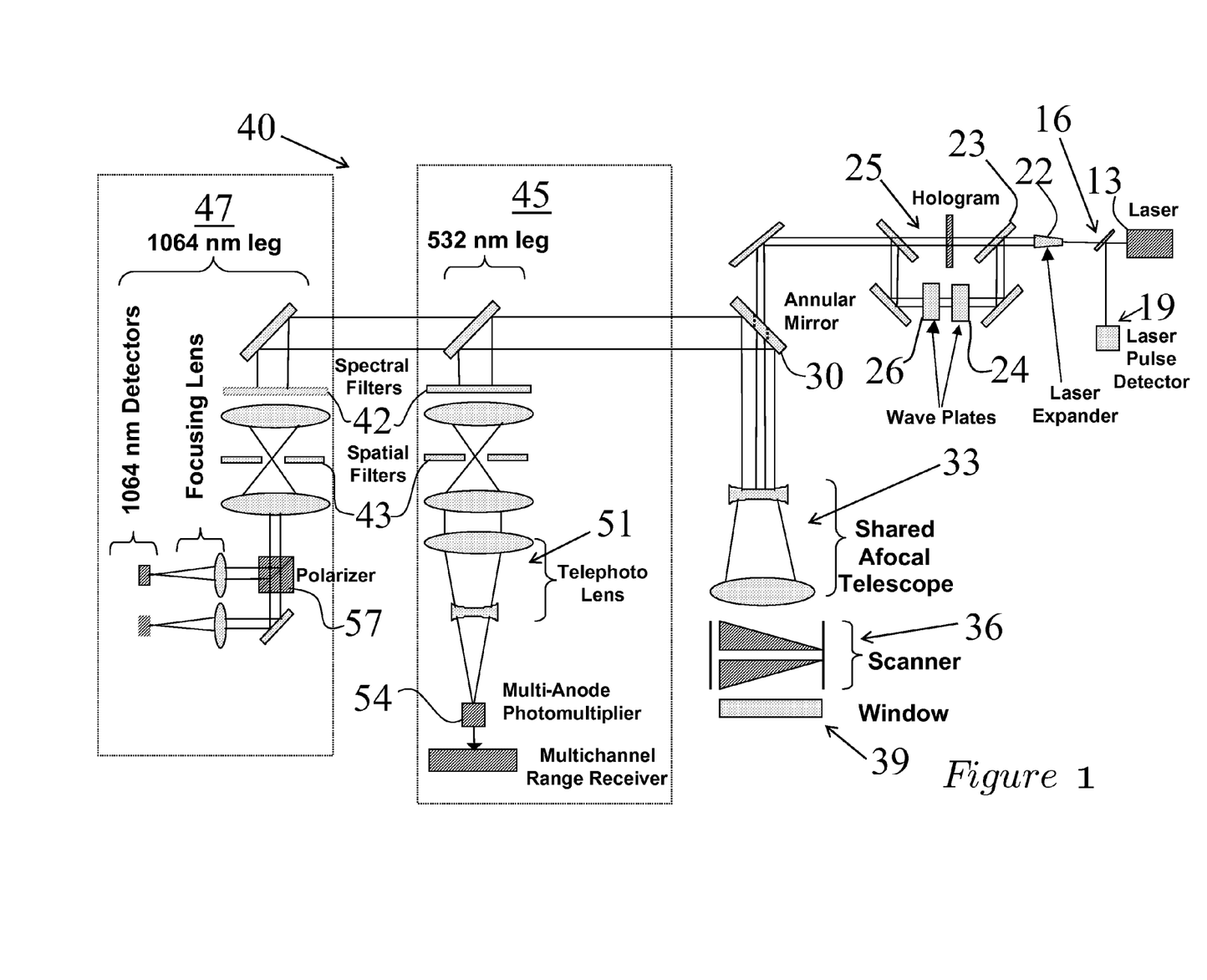
FIG. 1 is an optical schematic drawing of a system according to an embodiment of the present invention.

Referring to FIG. 1, an optical schematic for a combined three-dimensional LIDAR imager/laser polarimeter according to the present invention is shown generally as 10 in FIG. 1. A small fraction of the outgoing laser pulse from a frequency-doubled Nd:YAG microchip laser 13 through a high reflectivity splitter mirror 16 and detected by pulse detector 19 which provides a start pulse for a multichannel timing receiver (not shown).

The near infrared polarimeter beam at 1064 nm and the visible imaging beam at 532 nm are both expanded by laser beam expander 22 to about 3 mm diameter. The two beams are then separated by a dichroic beam splitter. The 532 nm beam is input to a Holographic Optical Element (HOE) 25, which creates a 10×10 array of quasi-uniform intensity spots in the far field of the LIDAR 10. Over 80% of the original laser energy is shared roughly equally within the 10×10 array of far field spots with the remainder lost to higher orders of the HOE 25 outside the receiver field of view (FOV). The orientation of the transmitted spots relative to the scan direction can be adjusted by rotating the HOE 25 in its holder about the transmitter optical axis. In the implementation of the present invention, the scan direction, which is at 45 degrees to the velocity vector of an aircraft carrying the LIDAR 10, is parallel to one axis of the 10×10 beam array, as in FIG. 2.

The near infrared (polarimeter) beam at 1064 nm is reflected by a dichroic beam splitter 23 and, for the most efficient type II doubling crystals, is elliptically polarized. A quarter-wave plate 24 is used to linearize the polarization while a second half-wave plate 26 rotates the linearly polarized light to the desired orientation.

The transmitted beams are recombined at a second dichroic beam splitter and then passed with 100% efficiency through the central hole of an annular Transmit/Receive mirror 30, expanded by a shared afocal telescope 33, and passed through a dual wedge scanner 36 and a protective window 39 to the target area. Photons reflected from the target area pass through the scanner 36 and shared afocal telescope 33 and the majority are reflected by the annular mirror 30 into the receiver, shown generally as 40, having an imaging channel (532 nm leg) 45 and a polarimetry channel (1064 nm leg) 47. Spectral filters 42 and spatial filters 43 in both the imaging channel 45 and polarimetry channel 47 restrict the noise background.

In the imaging channel 45, a telephoto (long focal length) lens 51 images the 10×10 far field pattern onto the photocathode of a 10×10 Hamamatsu segmented anode microchannel plate photomultiplier (MCP/PMT) 54. Each of the 100 images on the photocathode is relayed by the internal microchannel plates to an individual anode in the 10×10 anode array. The orientation of the received image of the 10×10 spot array can be matched to that of the anode (or APD) array via a Dove prism (not shown) rotated about the optical axis in the 3D imaging receiver path 45. A 100 channel, multistop timing receiver (not shown), then records multiple single photon events in the multi-anode outputs.

In the polarimetry channel 47, the returning photons are separated by polarizer 57 into two paths based on polarization, and the signal amplitudes are recorded to determine the amount of depolarization caused by the target. This can be augmented to four channels for full recovery of the Stokes parameters if desired.

Figure 3:
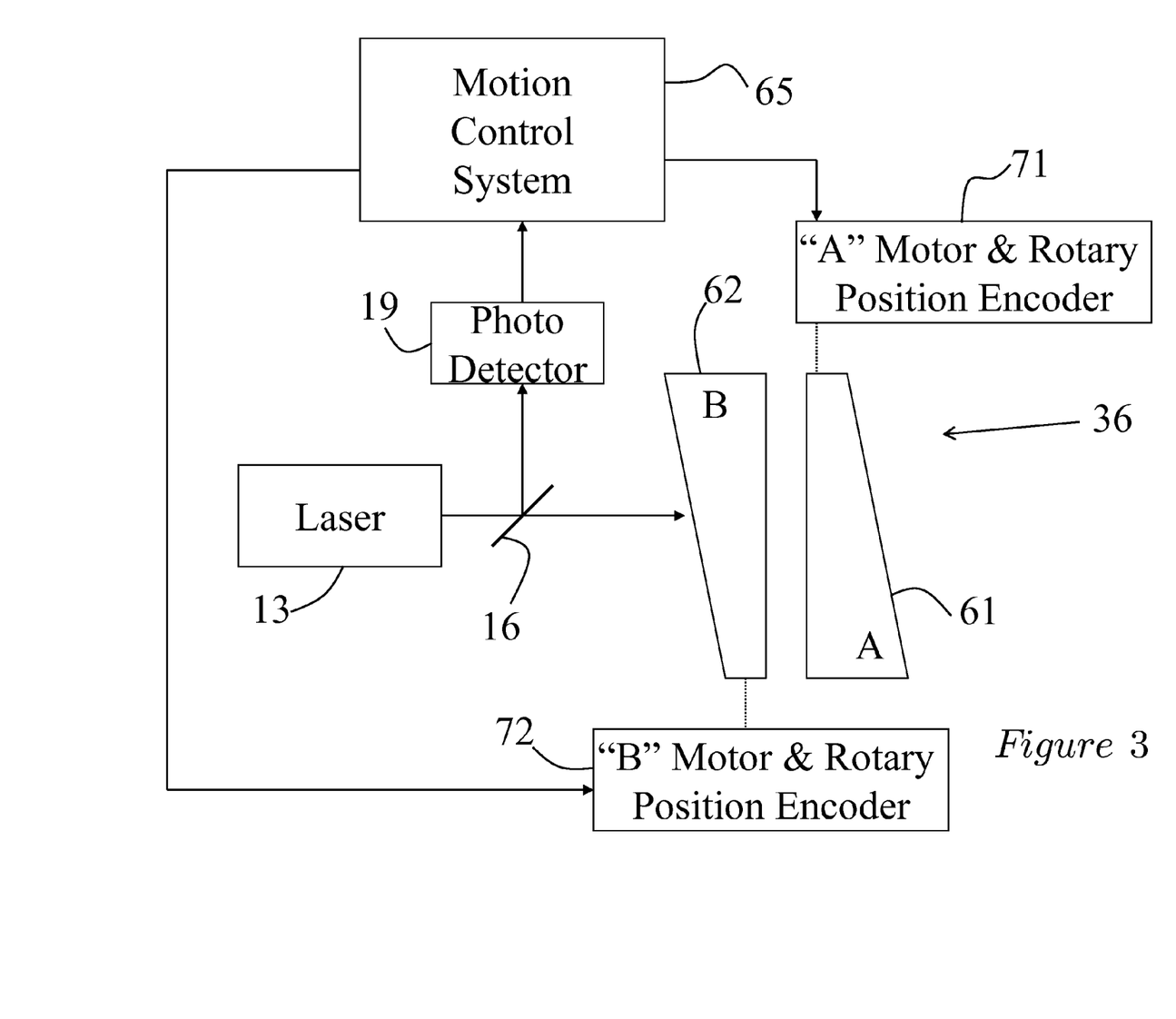
FIG. 3 is a schematic drawing of a scanner control system according to an embodiment of the present invention.

Referring to FIG. 3, the dual wedge scanner 36 consists of two equal optical wedges 61, 62 and can be used to generate a wide variety of optical scan patterns. These options include (but are not limited to) a displaced conical scan (one wedge rotating and the other stationary), line scans with arbitrary orientation to the host velocity (two wedges rotating at the same frequency but in opposite directions and with different starting phases), or arbitrary two-dimensional patterns such as a rotating line scan (two counter-rotating wedges operating at slightly different frequencies), a spiral scan (two wedges rotating in the same direction but at slightly different frequencies), etc. The two-dimensional patterns are especially useful for generating three-dimensional images from a stationary, hovering, or slow moving host platform.

As is shown in FIG. 3, laser pulses from the laser 13 impinge on a splitter mirror 16, which directs a small portion of the laser light to a pulse detector 19. This pulse detector signal is sent to an input of a microprocessor-controlled motion control system 65 that controls two servomotors 71, 72. The motors independently control the angular position of wedge 61 and wedge 62.

In the preferred system configuration, the motors 71, 72 may directly support the wedges 61, 62 with their shaft axes that are preferably hollow (as in an annular ring motor), and this configuration is termed the "direct-drive" type system. In yet another design, termed the "indirect-drive" type, the motors 71, 72 may rotate the wedges 61, 62 indirectly by the use of a drive belt. In either case, the rotary position encoders are preferentially mounted directly to the optical wedge/bearing system, allowing a very precise and real-time measurement of the wedge position. Typically, rotary encoders are of the optical type, and include a relative position track consisting of lines that are etched on an encoder disc, and also a separate "index" track or a once-per-revolution marker, used to determine the absolute position of the encoder wheel with respect to a starting location.

An important and unique feature of the optical scanner of the present invention is that the motion control system 65 synchronizes the rotation rates of the wedge scanners 36 with high precision to the multi-kilohertz laser fire rate. This causes the beam pattern to be laid down in precisely the same way on each scan cycle, eliminating the need to record the orientations of the two wedges accurately on every laser fire, which typically occurs at multi-kHz rates. Instead, one can record the epoch times at which the wedges cross a programmable reference on each scan cycle (nominally about 20 Hz). This approach can also compensate for small drifts in the laser fire rate, which can occur in passively Q-switched lasers as described below. The stability of the scan can be further monitored by timing the reference output for each wedge relative to the next laser fire as described below.

The operational sequence of the system consists of the following steps:

1. The mechanical motion system locates the "home" position for each wedge motion axis. This homing sequence allows both wedge angles to be known to a very high degree of precision. For a line scan, as an example, the motion control system may command both wedges 61, 62 to be turned so that the maximum deviation angle is, for example, pointed initially in the same direction. For example, for a vertical line scan, the initial wedge positions may be directed precisely downward as a start.
2. The laser 13 is turned on and allowed to stabilize to its operational frequency. In practice, commercial CW-pumped passively Q-switched lasers typically operate at a rate between 8 kHz and 30 kHz, depending on the laser design parameters and/or CW diode pump levels. Typically, after approximately a ten minute warm-up period, the laser frequency is stable to a few cycles per second, with a general tendency of slow frequency drift on the order of a few cycles per second drift per hour. In contrast, the repetition rates of pulse-pumped (quasi-CW) or actively Q-switched lasers are controlled by a high precision timing oscillator and experience virtually no drift in repetition rate.
3. The microprocessor-controlled motion control system 65 is directed to be in a "synchronized gantry motion" mode. In this mode, the motion controller is directing the wedges 61, 62 to move in a precise motion that is locked to move in unison to a command position profile. This type of precision-locked motion is commonly used for the control of, for example, gantry-type robotic devices, which typically employ two motorized actuators on each side of a long, flat bed type motion stage. For this configuration, it is essential that the motors on either side of the gantry robot move exactly in unison in order to keep the gantry tower position orthogonal to the bed axis. This mode of motion control is often termed "gantry-mode".
4. The command position profile that the motion control system 65 generates begins with a slow synchronized rotation. The motion control system 65 moves both wedges 61, 62 at the same rate, but in opposite directions, and this motion is precisely controlled to be synchronous by the motion control system 65.

During this mode, the key aspect of the invention is that the clock source for this slow rotation is the laser 13, rather than a separate clock oscillator such as the microprocessor's oscillator. For example, in a typical system, the initial slow rotation may be achieved by setting up the motion control system to move the wedges exactly one-encoder count per laser shot.

Typically, the system is set up with on the order of 100,000 encoder "counts" per revolution, and the laser pulse rate is on the order of 10,000 pulses per second. In this case, the rotational rate of the wedges would be exactly 0.1 revolutions per second.
5. After the above constant angular motion is reached, the motion control system 65 is then configured to move exactly two encoder counts per laser shot. This in effect doubles the command rate of rotation of the wedges 61, 62. After a second or two, the motion control system has had sufficient time to accelerate the wedge rotation rate to this new velocity, and once again, the wedges are locked in perfect synchronized motion with the clock source being the laser pulse rate.
6. Step 5 is then advanced further, with the integer relationship between the laser shot rate and the associated angular motion being advanced until the desired point where each laser shot advances the motion of the wedges by n encoder counts.

Since a primary goal of this invention is to simplify the data acquisition requirements, it has been noted that there is an optimum for the value of n. Specifically, the ideal value of n is found to be a number that divides into the total number of encoder counts by an integer value. For example, the one encoder used in a prototype system has 72,000 encoder counts per revolution. The laser used for the demonstration prototype had a pulse rate of 8000 pulses per second. A desired wedge rotation rate was 20 cycles per second. This was accomplished by dividing the encoder counts per second at this speed (1,440,000 per second) by the shot rate, 8000, and the result, 180, then represented the desired value of n.

With this configuration, the number of laser shots fired for a single wedge rotation was 8000/20 or 400 shots per revolution. Thus, the wedge is rotated by exactly one revolution every 400 shots, and laser pulses 1 and 400 then are emitted at exactly the same angle by the system. Any variance, caused either by the shot-to-shot variance of the laser pulse time or small positioning errors of the motion control system, is small.

Furthermore, with this set up, it can be seen that as the laser firing rate drifts slowly with time, the effect is to increase or decrease the rotational rate of the wedges so that the laser fires at the same rotational phase angles.

Thus, with this system, a contiguous topographic map requiring several hours to complete will be created in such a way as to always have virtually identical exit angles for the laser on each 400 point scan, even though the pulse rate of the laser may vary slowly over the multi-hour mapping mission. This results in greatly reduced onboard data acquisition and storage requirements relating to scanner positioning as well as considerably simplified data geolocation and preprocessing procedures.

Figure 4A:
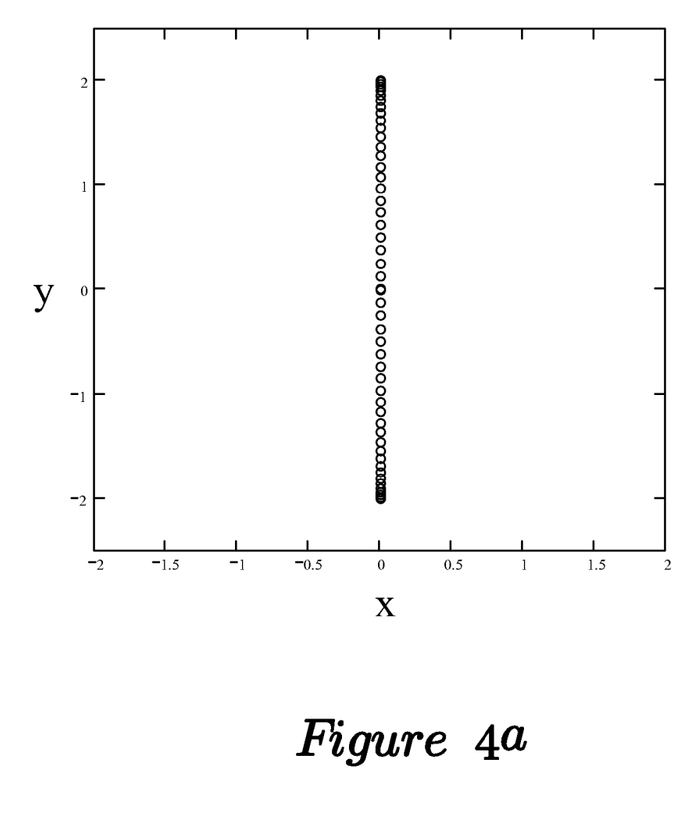
FIGS. 4(a)-(b) shows sample scan patterns according to an embodiment of the present invention.
Figure 4B:
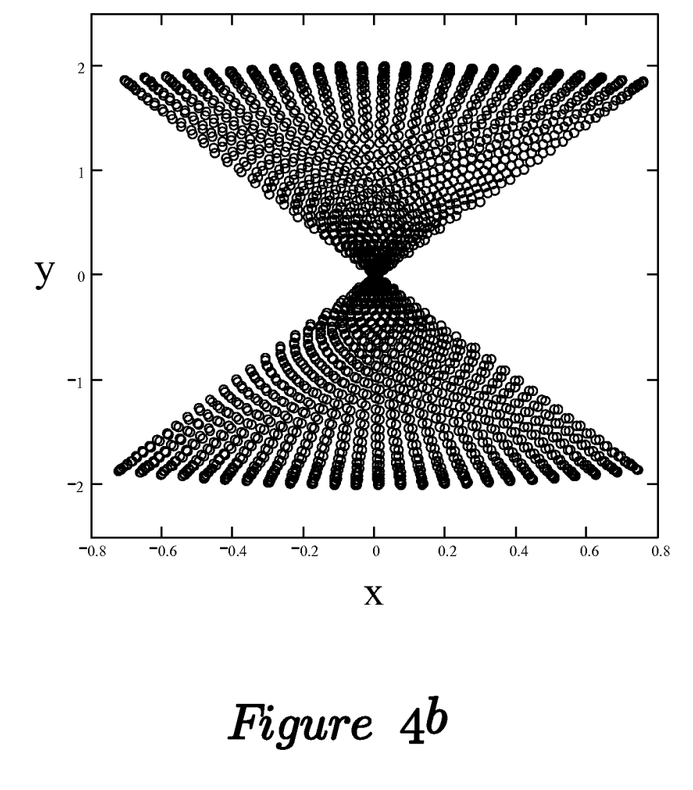

FIG. 4(a) shows a one-dimensional linear scan pattern. FIG. 4(b) shows a two-dimensional rotating line scan from the dual wedge optical scanner. Both are synchronized to the laser fire rate. The dual wedge optical scanner 36 can create conical, linear scans with arbitrary orientation with respect to the aircraft velocity (see FIG. 4a), or more complex two-dimensional scan patterns such as a rotating line scan (FIG. 4b) or spiral scan. In addition to the simple integer-lock fixed line scan mode discussed previously, the same motion control system 65 may be configured under software control to do other repeatable (i.e. overlapping spots on subsequent scan cycles) scan patterns of interest.

These are described as follows:

Slow Line Sweep Mode

It can be shown that the scan produced by the counter-rotating wedge system is essentially a nearly perfect line that rotates at a rate that is the difference between the two wedge velocities.

From this, it can be seen that it is possible to set up the system in a slow line sweep mode. For example, referring to the original set up, the electronic motion control system 65 can be set up such that wedge 61 moves by 180 encoder counts per laser shot, but wedge 62 is set up to move by an amount different from this value. For example, if the wedge 62 were set up to move 160 encoder counts per shot, with the 72,000 encoder count/revolution encoder, the rotation rate for the 8000 laser pulse per second laser would be such that 450 laser pulses were fired per wedge rotation for wedge 62. This would result in an angular rotation rate of 17.777 rotations per second. The result would be a line that rotates at a rate corresponding to the difference of the two wedge rotation rates, which is 20−17.778=2.222 cycles per second.

Conical Scan with Variable Angle Mode

It can be shown that the scan produced by the dual wedge scanner 36 may also be configured with the two wedges 61, 62 rotating in the same direction. For this orientation, a very different pattern results.

For the case where the wedges 61, 62 are set up to rotate at exactly the same speed, the result is a conical scan. Because the system is controlled by the motion control system 65, it is possible to vary the phase angle of the wedges to be any desired angle.

It can be shown that the deviation angle of the conical scan is a simple function that is related to the relative angle between the wedges 61, 62. For example, the wedges may be oriented so that they both deviate the beam in the same direction, i.e. such that the thickest portion of both wedges are in alignment. In this case, the phase angle is zero, and the result would be a conical scan with the maximum angular deviation.

If it is desired, the angle of deviation of the conical scan may be varied. This is done by varying the phase angle between the wedges. For example, if the phase angle between the wedges is around 90 degrees, the result is that the deviation angle is reduced by roughly 30%.

Spiral Scan Mode

It can be shown that, in the case where both wedges 61, 62 are rotating in the same direction and linked to the laser pulse motion as described above, any small variation in the rotation rate of wedge 61 and wedge 62 will result in the conical scan diameter changing with respect to time, collapsing to a point and then expanding to a conical scan with maximum diameter. The rate that the scan collapses and expands can be shown to be the difference between the angular rotation rates of the two wedges 61, 62.

In effect then, a spiral scan mode can be achieved with the system by setting up the synchronized rotation to result in a slightly different rotational "gear ratio". In the case where, for example, wedge 61 has a gear ratio of 180, and wedge 62 is set up with a gear ratio of 160, the result will be a spiral scan with a rate of collapse of 2.222 cycles per second (see above analysis).

Figure 5:
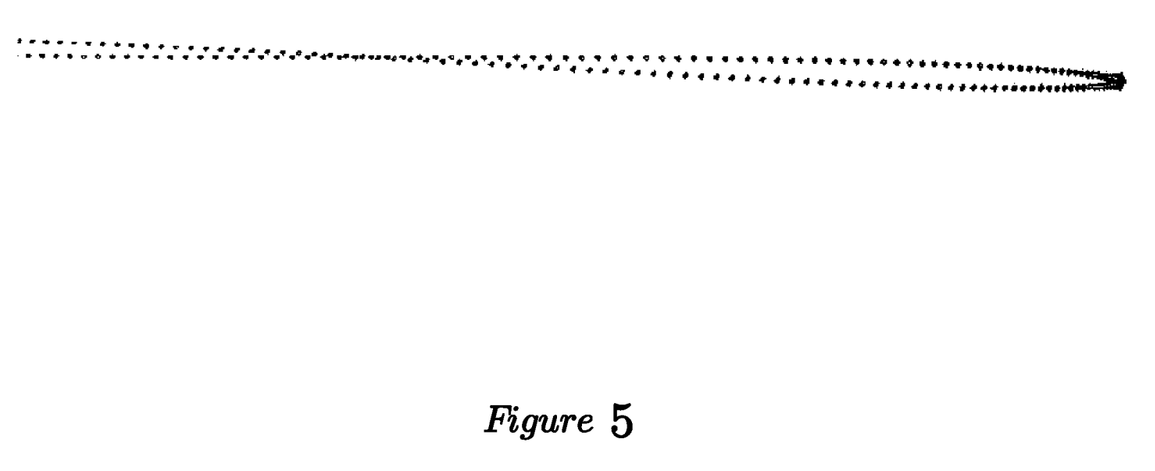
FIG. 5 shows a time exposure linear scan pattern over many scan cycles according to an embodiment of the present invention.

In FIG. 5, the optical scan is synchronized to a nominal 8 kHz laser pulse train which, for a stationary host platform, causes the spots from the various scan cycles to fall on top of each other at the ground. This synchronization capability negates the need for recording the scanner wedge positions on every shot for moving platforms such as aircraft or spacecraft, and greatly reduces the amount of ancillary LIDAR data that must be recorded in-flight or transmitted to the ground. FIG. 5 shows a time exposure (over many scans) of the linear scan pattern that creates an "infinity-shaped" pattern in the near field due to the local displacements of the laser beam in the wedges. The pattern collapses into a true line in the far field of the scanner. The presence of discrete Gaussian spots, in FIG. 6, as opposed to a continuous line of light, is a visual demonstration of the effectiveness of the synchronization of the scanner to the laser pulse train. More detailed experimentation shows that the total movement of the far field spot image within the corresponding detector pixel due to laser/scanner synchronization errors is about ±7% of the pixel dimension or 0.7% of the full 10×10 grid pattern in the present belt-driven scanner implementation. The latter stability can be further improved upon via the use of direct drive systems.

Figure 2:
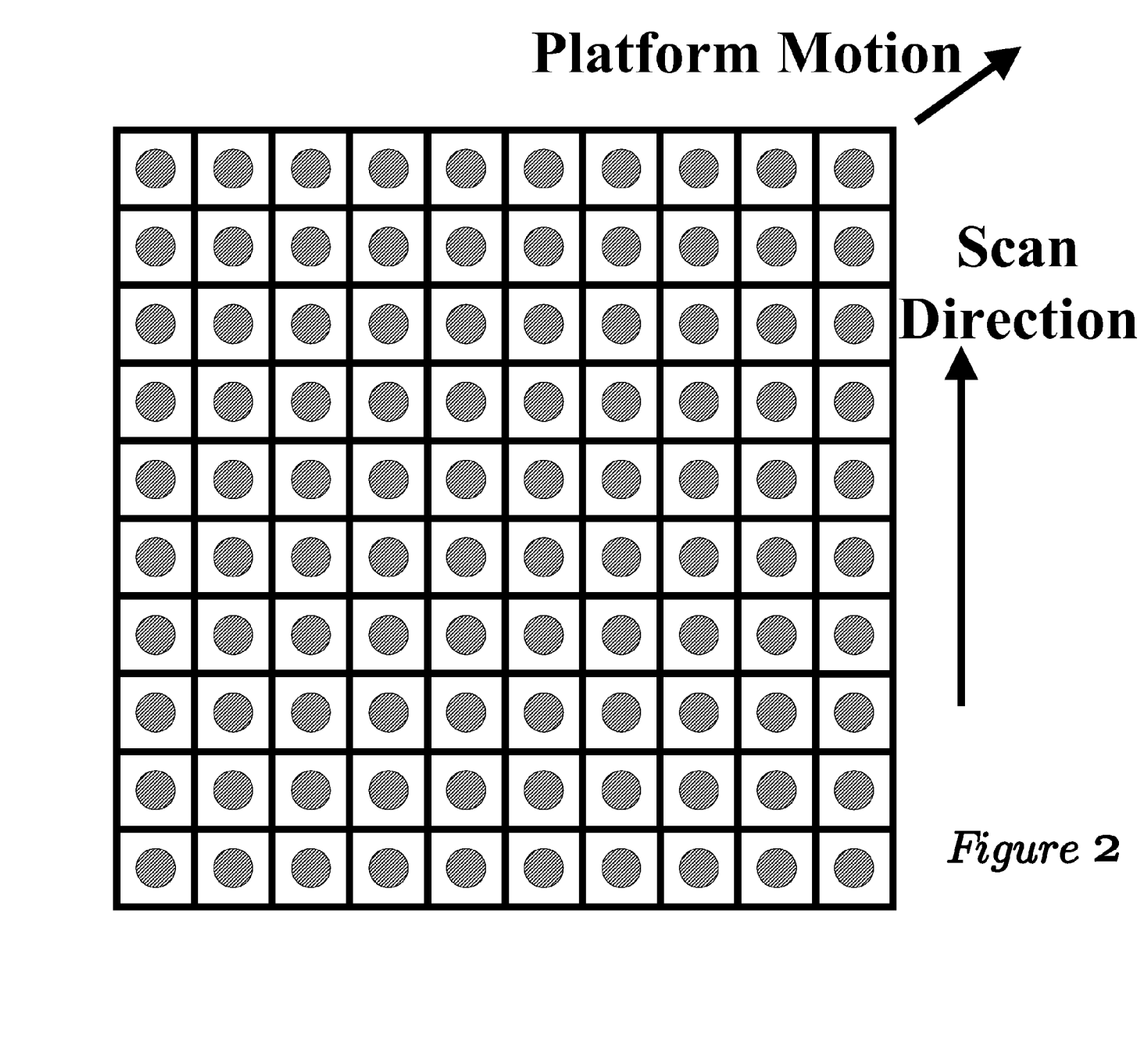
FIG. 2 shows a scan direction in relation to the platform motion according to an embodiment of the present invention.
Figure 6:
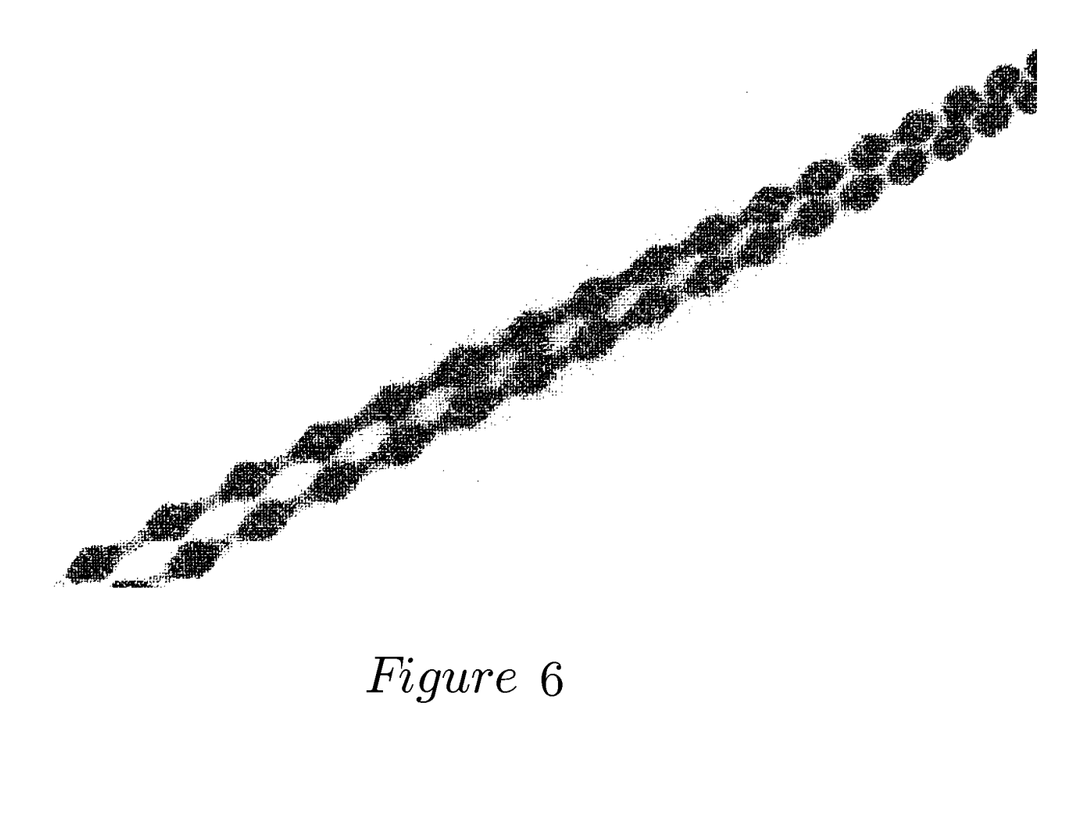
FIG. 6 shows a close up view of a time exposure linear scan pattern over many scan cycles according to an embodiment of the present invention.

The holographic element 25 in the transmitter path breaks each Gaussian spot in FIG. 6 into a 10×10 array of roughly uniform intensity spots, i.e. the hologram in the transmitter path breaks each laser footprint into 100 beamlets of approximately uniform amplitude (see FIG. 2). Each beamlet is then imaged onto portions of the photocathode that are linked via the amplifying micro channel tubes to individual anodes of a segmented anode micro channel plate photomultiplier. In the case of photon-counting photodiode arrays, each beamlet is imaged onto a single photodiode. If necessary, a Dove prism or other image rotation device in the receive path (not shown) can be used to orient the returning 10×10 image to coincide with the photodiode or anode array. Each anode output is then input to a high precision, 100 channel, multistop timer so that a 100 pixel three-dimensional image is obtained on every laser fire. The detector field of view contains over 80% of the original energy; the rest is lost to the higher orders. Thus, each laser pulse provides a 100 pixel three-dimensional image of the topography. These individual images are then mosaiced together via the combined action of the host platform velocity and the optical scanner to form a contiguous three-dimensional image of the ground surface in a single overflight.

Additional features not disclosed in the prior art include:
1. The use of a holographic element 25 to split the Gaussian laser beam into a quasiuniform 10×10 array of ground spots that is then scanned in an arbitrary pattern. This provides more uniform signal strength to the various imaging detector pixel or anode channels and reduces the level of optical crosstalk between channels, thereby resulting in a higher fidelity three-dimensional image.
2. A dual wedge scanner 36 that is synchronized to the laser pulse train. Besides producing an infinite variety of well-controlled scan patterns, this enhancement reduces the amount of ancillary wedge orientation information by two to three orders of magnitude thereby greatly reducing onboard data storage and/or transmission requirements.

In testing of the current embodiment, the aircraft velocity, combined with the optical scanner, should produce a contiguous three-dimensional image on a single overflight from an altitude of 1 km. At this altitude, the scanning system has a 200 m swath with a 15 cm horizontal resolution and few centimeter (less than 5) vertical ranging resolution.

The invention has been described with references to a preferred embodiment. While specific values, relationships, materials and steps have been set forth for purpose of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

We claim:

1. An imaging LIDAR system for three-dimensional and polarization imaging of topographic surfaces and volumetric scatterers comprising:
   a common light source arranged for use onboard an aircraft or spacecraft that can transmit a coherent beam of light characterized by at least two different wavelengths;
   an optical dual wedge scanner including, a first rotating optical wedge, a second rotating optical wedge, and configured to control the first and the second rotating optical wedge to simultaneously scan both a transit beam of light and a receive beam of light;
   a pulse detector configured to detect the receive beam of light, after being redirected from the topographic surfaces and volumetric scatterers arranged for use onboard an aircraft or spacecraft, and a polarizer configured to generate at least one imaging signal and at least one depolarization signal responsive to the redirected receive beam of light; and
   a microprocessor configured to process the at least one imaging signal and at least one depolarization signal generated by the means for detecting the receive beam of light;
   wherein, the common light source is arranged to generate and to transmit a multitude of distinct pulses of light having the at least two different wavelengths, of which the at least one wavelength had been chosen for generation of the at least one imaging signal and the at least another wavelength had been chosen for generation of the at least one depolarization signal.

2. The imaging LIDAR system of claim 1, wherein the detecting the receive beam of light include a laser polarimeter for detecting changes in polarization of the receive beam of light caused by reflections of the transmitted beam of light from the topographic surfaces and volumetric scatterers.

3. The imaging LIDAR system of claim 1, wherein the common light source incorporates a Holographic Optical Element which splits the coherent beam of light into an array of quasi-uniform intensity spots in a far field of the imaging LIDAR system.

4. The imaging LIDAR system of claim 3, wherein the array of quasi-uniform intensity spots is a 10×10 array.

5. The imaging LIDAR system of claim 1, wherein the common light source incorporates a Q switched frequency-doubled Nd:YAG microchip laser.

6. The imaging LIDAR system of claim 5, wherein the Q switched frequency-doubled Nd:YAG microchip laser have been arranged to transmit a multitude of laser pulses having a laser pulse fire frequency in a kilohertz range.

7. The imaging LIDAR tem of claim 6, wherein the laser pulse fire frequency is between 8 kHz and 30 kHz.

8. The imaging LIDAR system of claim 1 further comprising a splitter mirror and a pulse detector where the splitter mirror directs a portion of the multitude of distinct pulses of light into the pulse detector.

9. The imaging LIDAR system of claim 8, wherein the optical dual wedge scanner further comprises at least one driving motor and a motion control system.

10. The imaging LIDAR system of claim 9, wherein the at least one driving motor directly supports at least one of the first optical wedge and the second optical wedge with at least one shaft in a direct-drive arrangement.

11. The imaging LIDAR system of claim 10 wherein the at least one shaft is hollow.

12. The imaging LIDAR system of claim 9, wherein the at least one driving motor utilizes at least one drive belt to drive the at least one of the first optical wedge and the second optical wedge in an indirect-drive arrangement.

13. The imaging LIDAR system of claim 9, wherein the motion control system has been arranged to synchronize at least one rotation rate of the at least one of the first optical wedge and the second optical wedge to the multitude of distinct pulses of light fire times, as detected by the pulse detector.

14. The imaging LIAR system of claim 13, wherein the synchronization of the at least one rotation rate of the at least one of the first optical wedge and the second optical wedge have been arranged to utilize the multitude of distinct pulses of light fire times as a clock oscillator time.

15. The imaging LIDAR system of claim 14, wherein the motion control system, have been arranged to be timed by the pulse detector in order to advance the at least one rotation of the at least one of the first optical wedge and the second optical wedge by a predetermined integer number n of encoder counts per at least one laser pulse fire.

16. The imaging LIDAR system of claim 15, wherein the predetermined integer number n of encoder counts have been prearranged between 1 and 72 000.

17. The imaging LIDAR system of claim 15, wherein the predetermined integer number n of encoder counts have been prearranged to divide into a total number of encoder counts by an integer value.

18. The imaging LIDAR system of claim 1 further comprising an annular Transmit/Receive mirror which passes the coherent beam of light transmitted by the common light source and reflects the received beam of light.

19. The imaging LIDAR system of claim 1, wherein the detecting the receive beam of light incorporate a shared afocal telescope.

20. The imaging LIDAR system of claim 19, wherein the shared afocal telescope has an aperture less than 50 cm in diameter.

21. The imaging LIDAR system of claim 19, wherein the shared afocal telescope has an aperture less than 10 cm in diameter.

22. The imaging LIDAR system of claim 19 wherein the shared afocal telescope has an aperture less than 5 cm in diameter.

23. The imaging LIDAR system of claim 1, wherein for detecting the received beams of light incorporate a photon counting array detector.

24. The imaging LIDAR system of claim 1, wherein the detecting received beam of light incorporate a multi-anode photomultiplier and a multichannel range receiver.

25. The imaging LIDAR system of claim 24, wherein the multi-anode photomultiplier is a segmented anode microchannel plate photomultiplier.

26. A method for three-dimensional and polarization imaging of topographic surfaces and volumetric scatterers by an imaging LIDAR comprising;
   transmitting a coherent beam of light using a common light source arranged for use onboard an aircraft or spacecraft that can transmit the coherent beam of light characterized by at least two different wavelengths;
   simultaneously scanning the coherent beam of light using an optical dual wedge scanner including, a first rotating optical wedge, a second rotating optical wedge, and controlling the first and the second rotating optical wedge to simultaneously scan both a transit beam of light and a receive beam of light; using means for detecting to detect the receive beam of light, after being redirected from the topographic surfaces and volumetric scatterers arranged for use onboard an aircraft or spacecraft, and generating at least one imaging signal and at least one depolarization signal responsive to the redirected receive beam of light, and using a microprocessor for processing the at least one imaging signal and at least one depolarization signal generated by the means for detecting the receive beam of light;
   wherein, the common light source is arranged to generate and to transmit a multitude of distinct pulses of light having the at least two different wavelengths, of which the at least one wavelength had been chosen for generation of the at least one imaging signal and the at least another wavelength had been chosen for generation of the at least one depolarization signal.

27. The method of claim 26, where topographic surfaces include objects and combination of objects chosen from a set of objects consisting of tend, ice, water surfaces and basins, man-made objects, solid and liquid surfaces of planets, satellites, comets, asteroids, and other celestial bodies.

28. The method of claim 26, where volumetric scatterers include objects and combination of objects chosen from a set of objects consisting of vegetation, tree canopies, crops, biomass, clouds, and planetary boundary layers.

29. The method of claim 26, where the step of transmitting the coherent beam of light comprises generation of a multi-kilohertz train of short light pulses, transmitting the light beam through a splitter mirror which redirects a fraction of light to a laser pulse start detector, expanding the light beam by a laser expander, portioning the laser beam into an array of quasi-uniform far field spots by a Holographic Optic Element, and transmitting the laser beam array through an opening on an annular Transmit/Receive mirror and a shared afocal telescope.

30. The method of claim 26, where the step of using means for detecting received beams of light after being reflected from the topographic surfaces and volumetric scatterers comprises passing the returning photons through the optical dual wedge scanner and the shared afocal telescope, reflecting the majority of the returning photons by the annular Transmit/Receive mirror, separating the returning photons into imaging and polarimetry channels, restricting the noise background using spectral and spatial filters, and imaging the array of quasi-uniform far field spots onto corresponding segmented anodes of a microchannel plate photomultiplier using a telephoto lens.

31. The method of claim 30, where the step of using means for detecting received beams of light after being reflected from the topographic surfaces and volumetric scatterers further comprises separating of the returning photons of polarimetry channel into two fractions based on polarization using a polarizer and detecting the polarization signals by focusing the polarized fractions of returning photons on separate detectors.

32. The method of claim 26, where the step of simultaneously scanning the coherent beam of light using an optical dual wedge scanner further comprises:
   locating accurately the home position for each wedge motion axis,
   stabilizing the laser pulse fire frequency,
   directing the wedges to move in unison in precision-locked motion controlled by the motion controller,
   initiating slow rotations of the wedges synchronized to the laser pulse fire frequency,
   gradually accelerating the rotations of the wedges to the point where each consecutive laser pulse commands the wedges to advance the angular displacement by additional predetermined integer n number of encoder counts such that n divides into the total number of encoder counts by an integer value,
   preserving the synchronization of the rotations of the wedges with the laser pulse fire frequency such that every consecutive $n^{th}$ laser pulse is transmitted at the practically identical exit angle as the corresponding pulse in the prior scan cycle.

33. The method of claim 26, where the rotations of the first and the second wedge are controlled to produce counter-rotating wedges with different angular velocities, resulting in a linear pattern of scanning points that rotates at a rate that is the difference between the two wedge angular velocities.

34. The method of claim 26, where the rotations of the first and the second wedge are controlled to produce co-rotating wedges rotating at the same speed and resulting in a conical scanning pattern with the deviation angle being a simple function of the relative phase angle between the wedges.

35. The method of claim 26, where the rotations of the first and the second wedge is controlled to produce co-rotating wedges with different rotation rates resulting in a spiral scanning pattern which periodically oscillates between a point and maximum deviation angle.

36. The method of claim 26, where the rotations of the first and the second wedge are controlled to produce counter-rotating wedges with the same angular velocities, resulting in a linear pattern of scanning points whose orientation is dependent on the relative phase of rotation.

* * * * *